(12) United States Patent
Umemoto et al.

(10) Patent No.: US 7,502,081 B2
(45) Date of Patent: Mar. 10, 2009

(54) REFLECTION TYPE LIQUID-CRYSTAL DISPLAY DEVICE

(75) Inventors: Seiji Umemoto, Osaka (JP); Toshihiko Ariyoshi, Osaka (JP); Takao Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 753 days.

(21) Appl. No.: 09/851,970

(22) Filed: May 10, 2001

(65) Prior Publication Data

US 2002/0005922 A1  Jan. 17, 2002

(30) Foreign Application Priority Data

May 12, 2000 (JP) ............... P. 2000-140320

(51) Int. Cl.
G02F 1/1335 (2006.01)
(52) U.S. Cl. ...................................... 349/63
(58) Field of Classification Search ............ 349/63, 349/62
See application file for complete search history.

(56) References Cited

U.S. PATENT DOCUMENTS

| 5,808,713 | A | | 9/1998 | Broer et al. |
| 6,048,071 | A | | 4/2000 | Sawayama .............. 362/31 |
| 6,067,143 | A | * | 5/2000 | Tomita ................ 349/143 |
| 6,243,068 | B1 | * | 6/2001 | Evanicky et al. ......... 345/102 |
| 6,295,104 | B1 | * | 9/2001 | Egawa et al. ............ 349/63 |

(Continued)

FOREIGN PATENT DOCUMENTS

EP  0 556 606 A1  8/1993

(Continued)

OTHER PUBLICATIONS

C.Y. Tai, et al.; "A Transparent Frontlighting System for Reflective-Type Displays" SID International Symposium Digest of Technical Papers,US, Santa Ana, SID, vol. 26, May 23, 1995; pp. 375-378.

(Continued)

Primary Examiner—Timothy Rude
(74) Attorney, Agent, or Firm—Sughrue Mion, PLLC

(57) ABSTRACT

A reflection type liquid-crystal display device has a reflection type liquid-crystal display panel, at least one illuminator, and an optical path control layer. The reflection type liquid-crystal display panel includes a liquid-crystal cell and a reflector, the liquid-crystal cell having a visual-side substrate, a back-side substrate and a liquid crystal. The visual-side substrate includes a transparent substrate, a transparent layer lower in reflective index than the transparent substrate, and a transparent electrode. The back-side substrate has an electrode, and the liquid crystal is held between the visual-side and back-side substrates so that respective electrode sides of the visual-side and back-side substrates are disposed opposite to each other. The reflector is disposed on the back-side substrate side. The illuminator is disposed on one of side surfaces of the reflection type liquid-crystal display panel. The optical path control layer has a repetitive structure of optical path changing slopes on an outer side of the visual-side substrate and being higher in refractive index than the low-refractive-index transparent layer. Each of the optical path changing slopes is inclined at an inclination angle in a range of from 35 to 48 degrees with respect to a reference plane of the visual-side substrate.

44 Claims, 3 Drawing Sheets

U.S. PATENT DOCUMENTS

| | | | |
|---|---|---|---|
| 6,323,919 B1 * | 11/2001 | Yang et al. | 349/63 |
| 6,340,999 B1 * | 1/2002 | Masuda et al. | 349/63 |
| 6,456,279 B1 * | 9/2002 | Kubo et al. | 345/173 |
| 6,456,344 B1 * | 9/2002 | Nemoto et al. | 349/64 |
| 2002/0140886 A1 * | 10/2002 | Sugiura et al. | 349/113 |

FOREIGN PATENT DOCUMENTS

| | | | |
|---|---|---|---|
| GB | 2 336 933 A | | 11/1999 |
| JP | 5-158033 | | 6/1993 |
| JP | 8-503792 A | | 4/1996 |
| JP | 10-509537 A | | 9/1998 |
| JP | 11-52370 A | | 2/1999 |
| JP | 11-202784 A | | 7/1999 |
| JP | 11-250715 | | 9/1999 |
| JP | 11-326903 | * | 11/1999 |
| JP | 2000-221501 A | | 8/2000 |
| WO | 99/06881 | | 2/1999 |

OTHER PUBLICATIONS

Japanese Office Action dated Nov. 13, 2007 issued for Japanese Patent Application No. 2000-140320.

* cited by examiner

REFLECTION TYPE LIQUID-CRYSTAL DISPLAY DEVICE

BACKGROUND OF THE INVENTION

1. Field of the Invention

The present invention relates to a reflection type liquid-crystal display device which can be easily reduced both in thickness and in weight, which is excellent in display quality and which can be used both in an external light mode and in an illumination mode.

The present application is based on Japanese Patent Application No. 2000-140320, which is incorporated herein by reference.

2. Description of the Related Art

Further reduction in thickness and weight of reflection type liquid-crystal display devices has been demanded for the purpose of reduction in size and weight of portable personal computers, portable telephone sets, etc. In the meanwhile, it was difficult to reduce the thickness and weight of a background-art reflection type liquid-crystal device provided with a front-lighting system using a side-light type light pipe (see Unexamined Japanese Patent Publication No. Hei. 11-250715) Incidentally, such a side-light type light pipe needs a plate thickness of about 2 mm or larger for light transmission. If optical members such as a light-diffusing plate, etc. are disposed on the light pipe, the thickness in total is generally increased to 3 mm or larger.

SUMMARY OF THE INVENTION

An object of the present invention is to provide a reflection type liquid-crystal display device which can be easily reduced both in thickness and in weight, which is excellent in display quality and which can be used both in an external light mode and in an illumination mode.

According to the present invention, there is provided a reflection type liquid-crystal display device comprising: a reflection type liquid-crystal display panel including a liquid-crystal cell and a reflector, the liquid-crystal cell having a visual-side substrate, a back-side substrate and a liquid crystal, the visual-side substrate including a transparent substrate, a transparent layer lower in reflective index than the transparent substrate, and a transparent electrode, the back-side substrate having an electrode, the liquid crystal being held between the visual-side and back-side substrates so that respective electrode sides of the visual-side and back-side substrates are disposed opposite to each other, the reflector being disposed on the back-side substrate side; at least one illuminator disposed on one of side surfaces of the reflection type liquid-crystal display panel; and an optical path control layer having a repetitive structure of optical path changing slopes on an outer side of the visual-side substrate and being higher in refractive index than the low-refractive-index transparent layer, each of the optical path changing slopes being inclined at an inclination angle in a range of from 35 to 48 degrees with respect to a reference plane of the visual-side substrate.

In the reflection type liquid-crystal display device according to the present invention, incident light from an illuminator disposed on one of side surfaces of a liquid-crystal display panel is transmitted efficiently toward another side surface facing the side surface by use of liquid-crystal cell substrates, and the optical path of the transmitted light is changed efficiently into a viewing direction of the panel by means of an optical path control layer disposed on the visual side and a reflector disposed on the back side. Accordingly, the transmitted light can be used for liquid-crystal display. The optical path control layer excellent in thickness as well as the arrangement of the illuminator on the side surface of the panel can form a front-lighting mechanism for the display device. Moreover, display can be made also in an external light mode. There can be therefore obtained a reflection type liquid-crystal display device which is good in thickness and weight, which is bright and excellent in display quality, and which can be used both in an external light mode and in an illumination mode.

The aforementioned effect of the reflection type liquid-crystal display device is achieved by use of the low-refractive-index transparent layer and the slope reflection type optical path control layer, both the layers being provided on the visual-side substrate. That is, light incident on the side surface of the panel can be reflected efficiently toward another side surface facing the first-mentioned side surface by an enclosure effect owing to total reflection by use of the low-refractive-index transparent layer. Hence, uniformity of brightness on the whole of the display screen is improved, so that good display quality can be attained. If no low-refractive-index transparent layer is provided in the display device, backward transmission efficiency runs short so that the display screen becomes darker and viewing of the display becomes difficult as the viewing point goes farther from the illuminator. On the other hand, when the light incident on the side surface or the transmitted light thereof is reflected by optical path changing slopes, the optical path of the light can be changed with good directivity. Hence, it is difficult to attain the aforementioned effect by such a scattering reflection system with a roughened surface as described in Unexamined Japanese Patent Publication No. Hei. 5-158033.

That is, JP 5-158033 has suggested a reflection type liquid-crystal display device in which illumination light is made incident on one of side surfaces of a liquid-crystal display panel and totally reflected by a visual-side cell substrate and in which the reflected light is scattered by a roughened surface type reflection plate so as to be utilized for display. In this case, however, the light available for display is the light scattered and exited from the panel against the total reflection conditions. Scattered light generally exhibits a normal distribution with a peak in a regular reflection direction. Accordingly, the display light in the reflection type liquid-crystal display device is too inclined with respect to the frontal (vertical) direction to be effectively used for display. As a result, the display is dimmed in the frontal direction. However, if scattering by the roughened surface type reflection plate is intensified, the quantity of light in the frontal direction is reduced in the external light mode to be unfavorable to display. It is therefore necessary for such a roughened surface scattering reflection system to adjust the intensity of scattering so as to keep the balance between the external light mode and the illumination mode. However, it is difficult for such a roughened surface scattering reflection system to make the intensity of scattering favorable to both the modes because the intensity of scattering required in the external light mode is incompatible with that required in the illumination mode.

On the other hand, the slope reflection type optical path control layer according to the present invention mainly uses light exhibiting a peak in the regular reflection direction, and controls the optical path of the reflected light. Accordingly, the optical path control layer easily changes the optical path of the light with directivity favorable to display, particularly frontal directivity so that a bright illumination mode can be achieved. The flat portions of the optical path control layer other than the slopes can be used in the external light mode so that both the illumination and external light modes can be easily balanced into a state favorable to display.

Features and advantages of the invention will be evident from the following detailed description of the preferred embodiments described in conjunction with the attached drawings.

DETAILED DESCRIPTION OF THE PREFERRED EMBODIMENTS

Figure 1:
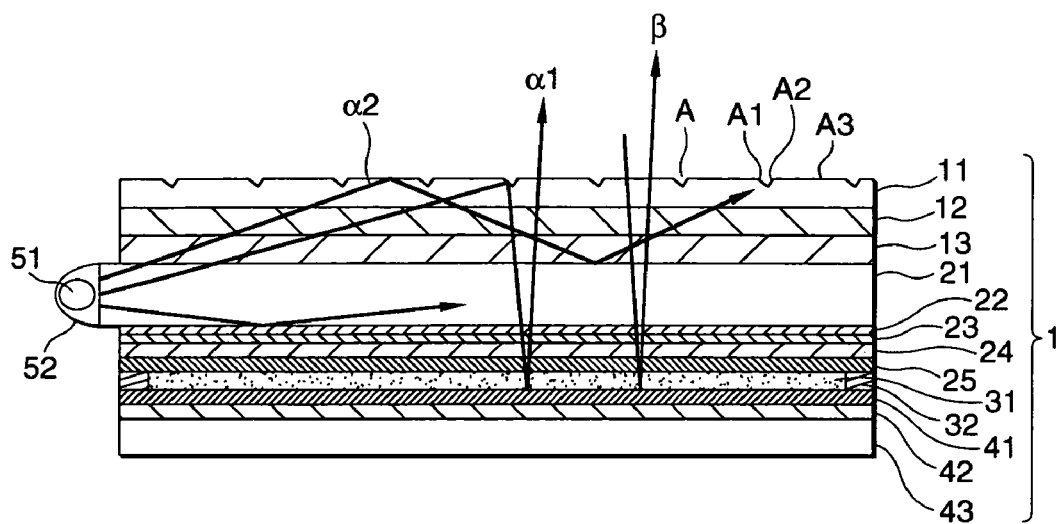
FIG. 1 is a sectional view for explaining an example of a reflection type liquid-crystal display device used both in an external light mode and in an illumination mode.

The reflection type liquid-crystal display device according to the present invention comprises: a reflection type liquid-crystal display panel including a liquid-crystal cell and a reflector, the liquid-crystal cell having a visual-side substrate, a back-side substrate and a liquid crystal, the visual-side substrate including a transparent substrate, a transparent layer lower in reflective index than the transparent substrate, and a transparent electrode, the back-side substrate having an electrode, the liquid crystal being held between the visual-side and back-side substrates so that respective electrode sides of the visual-side and back-side substrates are disposed opposite to each other, the reflector being disposed on the back-side substrate side; at least one illuminator disposed on one of side surfaces of the reflection type liquid-crystal display panel; and an optical path control layer having a repetitive structure of optical path changing slopes on an outer side of the visual-side substrate and being higher in refractive index than the low-refractive-index transparent layer, each of the optical path changing slopes being inclined at an inclination angle in a range of from 35 to 48 degrees with respect to a reference plane of the visual-side substrate.

FIGS. 1 and 2 and FIGS. 4 to 6 show examples of the aforementioned reflection type liquid-crystal display device. The reference numerals 1, 2, 3, 4 and 5 designate liquid-crystal display panels; 11, an optical path control layer; A1, an optical path changing slope; 21, a transparent substrate (visual-side substrate); 22, a low-refractive-index transparent layer; 24, a transparent electrode; 43 and 45, back-side substrates; 42 and 44, electrodes thereof; 31, a liquid crystal; 16 and 42, reflectors; and 51 and 53, illuminators. Hence, the electrode 42 serves also as a reflector. Incidentally, the reference numerals 12 and 15 designate polarizers; 13 and 14, phase retarders; 23, a color filter; and 25 and 41, aligned films.

Figure 2:
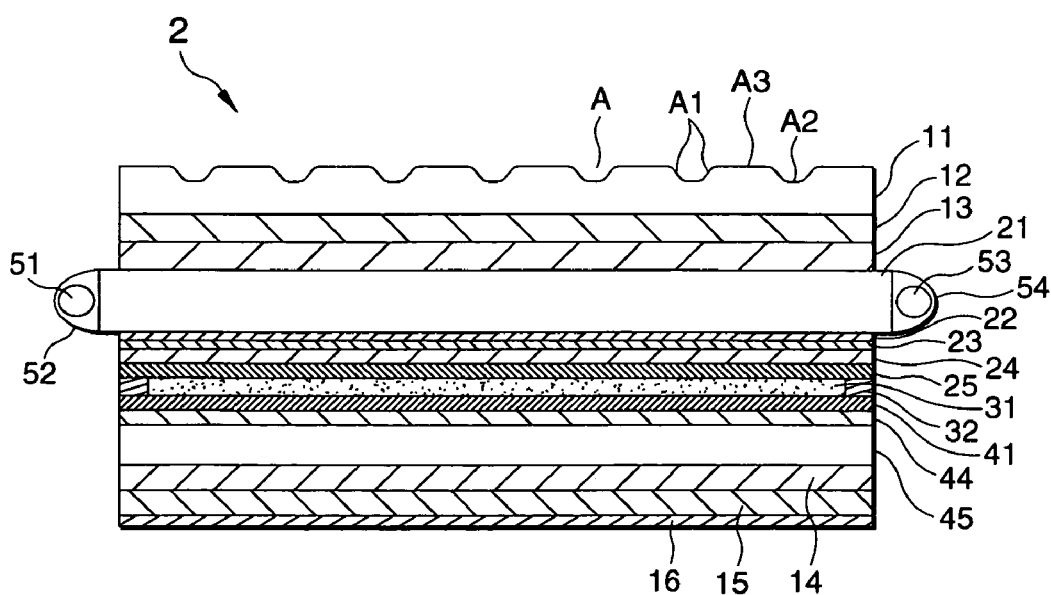
FIG. 2 is a sectional view for explaining another example of the reflection type liquid-crystal display device used both in an external light mode and in an illumination mode.

A suitable reflection type panel can be used as the liquid-crystal display panel without any specific limitation. For example, as illustrated in FIGS. 1 and 2, the reflection type liquid-crystal display panel includes a liquid-crystal cell, and a reflectors 42 or 16. The liquid-crystal cell has a visual-side substrate 21, a back-side substrate 43 or 45, and a liquid crystal 31. The visual-side substrate 21 is made of a transparent substrate (21) having a transparent layer 22 lower in reflective index than the substrate, and a transparent electrode 24. The back-side substrate 43 or 45 has an electrode 42 or 44. The liquid crystal 31 is held between the two substrates (21, 43) or (21, 45) disposed so that respective electrode (24, 42) or (24, 44) of the two substrates are opposite to each other. The reflector 42 or 16 is disposed on the back-side substrate 43 or 45 side. Incidence light on the visual side in which the optical path control layer 11 is disposed is reflected/inverted by the reflector 42 or 16 and controlled by the liquid crystal 31, or the like. As a result, the light is exited as display light from the visual side. Incidentally, the reference numeral 32 in FIGS. 1 and 2 designates a sealing material for enclosing the liquid crystal 31 between the substrates (21, 43) or (21, 45).

Incidentally, specific examples of the liquid-crystal cell described above may include: a twisted or non-twisted liquid-crystal cell such as a TN liquid-crystal cell, an STN liquid-crystal cell, a perpendicularly aligned liquid-crystal cell, an HAN liquid-crystal cell or an OCB liquid-crystal cell; a guest-host or ferroelectric liquid-crystal cell; a light-diffuse liquid-crystal cell; and so on. Any suitable method, such as an active matrix method, a passive matrix method, or the like may be used as a method for driving the liquid crystal. The liquid crystal is typically driven by the transparent electrodes 24 and 44 or the reflection type electrode 42 respectively provided between the pair of cell substrates (21, 43) or (21, 45), as illustrated in FIGS. 1 and 2.

As for the visual-side substrate, a transparent substrate is used so that display light can be transmitted through the transparent substrate. The transparent substrate can be made of a suitable material such as glass, resin or the like. Particularly, the substrate is preferably made of an optically isotropic material from the point of view of suppressing birefringence as much as possible to reduce light loss or the like. In addition, from the point of view of improvement in luminance or display quality or the like, a material superior in colorlessness and transparency is preferable, such as a no-alkali glass plate which surpasses a blue glass plate. Further, a resin substrate is preferable from the point of view of lightweight properties or the like.

The low-refractive-index transparent layer provided in the visual-side substrate is provided as a layer having a refractive index lower than that of the transparent substrate forming the visual-side substrate. Hence, when incident light from the illuminator 51 is transmitted inside the visual-side substrate 21, the transmitted light is totally reflected on the basis of the refractive index difference between the substrate 21 and the transparent layer 22 so as to be efficiently enclosed by the visual-side substrate, as represented by the broken line arrow α2 in FIG. 1. Hence, the transmitted light is efficiently transmitted backward so that the transmitted light is uniformly supplied to the optical path changing slopes of the optical path control layer in a position far from the illuminator. That is, the low-refractive-index transparent layer is provided for the purpose of improving uniformity of brightness on the whole display screen through the change of the optical path owing to reflection by the optical path changing slopes.

The low-refractive-index transparent layer is also provided for preventing the transmitted light from being reduced or made uneven on the basis of the partial change of the transmission state because the transmitted light suffers birefringence or scattering when the transmitted light enters the liquid-crystal layer. That is, the low-refractive-index transparent layer is provided for the purpose of preventing the display from becoming dark and preventing the display quality from being deteriorated because the display in a neighbor of the illuminator is ghosted in the rear. Further, in the case where a color filter or the like is disposed, the low-refractive-index transparent layer is provided for preventing the transmitted light from being rapidly absorbed in the color filter to thereby avoid reduction of the transmitted light. In the reflection type liquid-crystal display device in which incident light from the illuminator is transmitted inside the liquid-crystal layer as disclosed in JP 5-158033, the transmitted light is scattered by the liquid-crystal layer to thereby bring an uneven transmission state. As a result, unevenness of exit light or ghosting occurs to thereby make it difficult to view the display image.

The low-refractive-index transparent layer can be made from a suitable material such as an inorganic or organic low-refractive-index dielectric having a refractive index lower than that of the transparent substrate forming the visual-side substrate, by a suitable method such as a vacuum evaporation method or a spin coating method. The material and the method for forming the low-refractive-index transparent layer are not limited specifically. From the point of view of backward transmission efficiency owing to the total reflection or the like, it is preferable that the refractive index difference between the transparent layer and the transparent substrate is as large as possible. It is preferable that the refractive index difference is not smaller than 0.05, especially in a range of from 0.1 to 0.5. This degree of the refractive index difference has little influence on display quality in an external light mode. Incidentally, when the refractive index difference is 0.1, reflectance of external light in the interface between the transparent layer and the transparent substrate is not larger than 0.1%, that is, reduction of brightness or contrast owing to the reflection loss is very small.

The position of arrangement of the low-refractive-index transparent layer can be determined suitably. The low-refractive-index transparent layer is preferably positioned between the transparent substrate and the transparent electrode from the point of view of the aforementioned transmitted light enclosure effect, prevention of the light from entering the liquid-crystal layer, and so on. When a color filter is disposed between the transparent substrate and the transparent electrode, the low-refractive-index transparent layer is preferably positioned nearer the substrate 21 than the color filter 23 from the point of view of preventing the absorption loss of the transmitted light from being caused by the color filter. Therefore, the low-refractive-index transparent layer 22 is generally provided directly on the visual-side substrate 21. In this case, the fact that the surface of the substrate on which the transparent layer is provided is as smooth as possible, that is, the fact that the transparent layer is as smooth as possible, is favorable to prevention of scattering of the transmitted light. The fact is also preferable from the point of view of avoiding influence on display light.

If the low-refractive-index transparent layer is too thin, the enclosure effect may be reduced because of a wave effusion phenomenon. Therefore, the low-refractive-index transparent layer is preferably selected to be as thick as possible from the point of view of sustaining the total reflection effect. The thickness can be determined suitably from the point of view of the total reflection effect or the like. Generally, the thickness is selected preferably to be not smaller than a quarter wavelength (95 nm), more preferably to be not smaller than half a wavelength (190 nm), further preferably to be not smaller than one wavelength (380 nm), still further preferably to be not smaller than 600 nm, on the basis of the optical path length calculated by multiplying refractive index by layer thickness, from the point of view of the total reflection effect on the visible light with the wavelength in a range of from 380 nm to 780 nm, particularly on the light with the short-wave side wavelength 380 nm.

On the other hand, as for the back-side substrate, any suitable substrate 43 can be used, and the substrate 43 may be a colored substrate because the back-side substrate need not be light-transmissible in the case where the electrode 42 serving also as a reflector is provided in the liquid-crystal cell as illustrated in FIG. 1. In this case, a black substrate is preferably used from the point of view of black display if the liquid-crystal cell is of a type achieving display on the basis of light scattering or transmission/absorption difference. On the other hand, the transparent substrate 45 may be used if the reflector 16 is disposed outside the cell so that the back-side substrate needs to be light-transmissible as illustrated in FIG. 2. The transparent substrate 45 may be provided similarly to the visual-side substrate.

The thickness of the visual-side substrate and the thickness of the back-side substrate may be determined suitably in accordance with the strength of enclosure of liquid crystal, or the like, without any specific limitation. Generally, each of the thicknesses is selected to be in a range of from 10 μm to 5 mm, especially in a range of 50 μm to 2 mm, more especially in a range of from 100 μm to 1 mm from the point of view of balance between light transmission efficiency and reduction in thickness and weight. Particularly when the visual-side substrate is used as a substrate for transmitting incident light from the illuminator as described above, it is favorable that the sectional area of the substrate is as large as possible, that is, it is preferable that the substrate is as thick as possible, from the point of view of incidence efficiency, transmission efficiency, or the like. On the other hand, from the point of view of reduction in thickness and weight, it is favorable that the back-side substrate is as thin as possible. Therefore, the thickness of the visual-side substrate and the thickness of the back-side substrate may be equal to each other or may be different from each other. Incidentally, the visual-side and back-side substrates may have a uniform thickness or the visual-side substrate in particular may be shaped like a wedge in section so that the thickness thereof changes partially for the purpose of improving efficiency of incidence of transmitted light onto the optical path changing slopes on the basis of the inclination arrangement of the optical path control layer.

Figure 4:
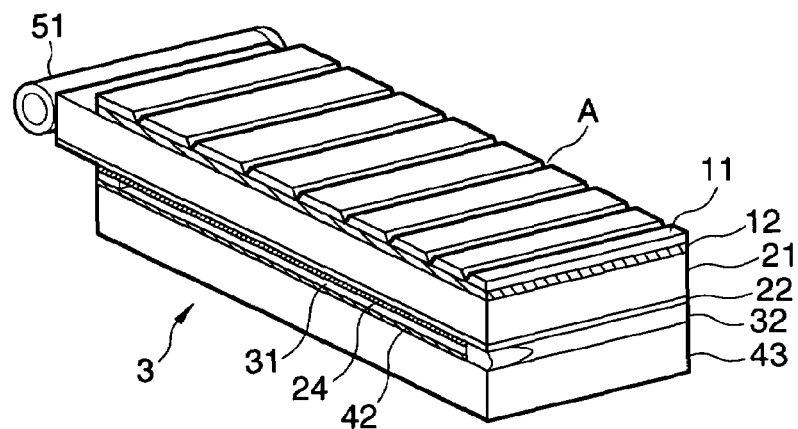
FIG. 4 is a perspective view for explaining a further example of the reflection type liquid-crystal display device.
Figure 5:
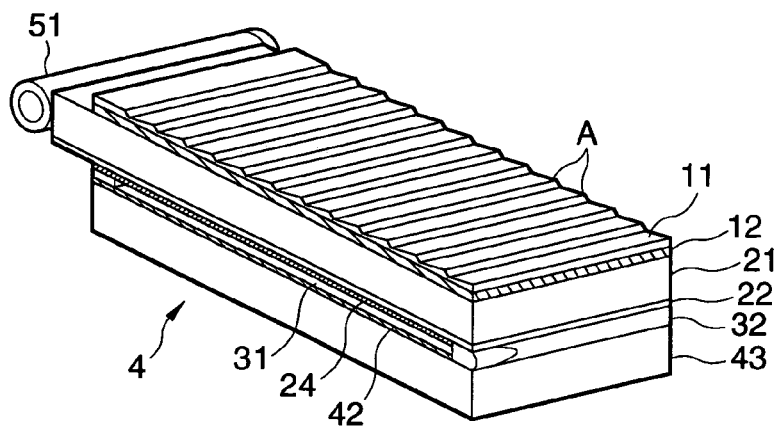
FIG. 5 is a perspective view for explaining a further example of the reflection type liquid-crystal display device.
Figure 6:
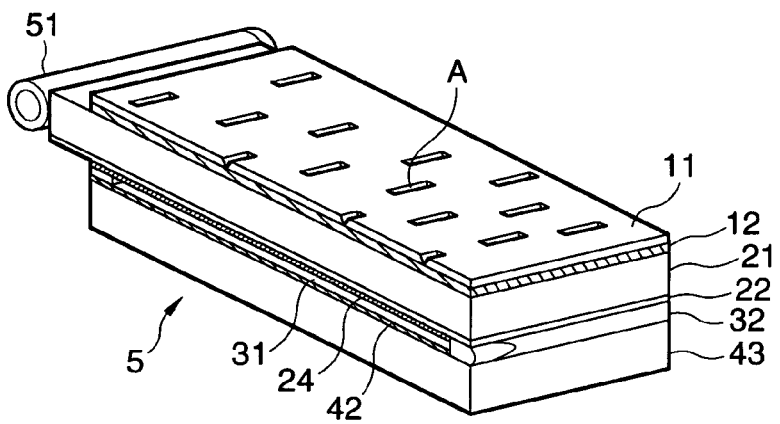
FIG. 6 is a perspective view for explaining a further example of the reflection type liquid-crystal display device.

The plan size of the visual-side substrate and the plan size of the back-side substrate may be also equal to each other or may be different from each other. When the visual-side substrate is used as a substrate for transmitting incident light from the illuminator, it is preferable that the side surface of the visual-side substrate 21 is protruded more greatly than the side surface of the back-side substrate 43 or 45 at least in the side surface where the illuminator 51 or 53 is disposed, from the point of view of efficiency of incidence, or the like, in the case where the illuminator is disposed on the protruded side surface as illustrated in FIGS. 4 to 6.

The transparent electrode 24 or 44 to be provided on the visual-side substrate 21 or the back-side substrate 45, and so on, may be made of any known suitable material such as ITO. On the other hand, the electrode 42 provided on the back-side substrate 43 or the like and serving also as a reflector may be made of, for example, a suitable reflective metal. The electrode 42 is preferably formed as a thin film of a high-reflectance good-electrical-conductivity metal such as aluminum. In this case, when the visual-side substrate is used as a substrate for transmitting the incident light from the illuminator, the electrode 42 may be provided also as a scattering reflector because light transmitted in the substrate hardly reaches the reflector before the light is reflected by the optical path changing slopes of the optical path control layer and because the transmitted light can be prevented from being disturbed by scattering reflection. This measure can be applied also to the case where the reflector is provided outside the cell as illustrated in FIG. 2.

The aforementioned reflector provided inside or outside the back-side substrate in the liquid-crystal cell is provided so that the incident light from the illuminator is transmitted and reflected by the optical path changing slopes A1 of the optical path control layer 11 as shown in the broken line arrow in FIG. 1. Hence, the optical path of the light is changed toward the back-side substrate. The light is reflected/inverted. That is, the reflector is provided for obtaining display light α1 in an illumination mode. Further, entrance external light through the optical path control layer 11 is reflected/Inverted. That is, the reflector is also provided for obtaining display light β in an external light mode. Thus, a reflection type liquid-crystal display device which can be used both in an external light mode and in an illumination mode is formed.

The reflector, especially the reflector provided outside the cell, may be formed of a suitable material, for example, a white sheet as described in the background art. High-refractive-index reflector is preferable. Particularly, examples of the reflector may include: a coating layer containing powder of a high-refractive-index metal such as aluminum, silver, gold, copper, chromium, or powder of an alloy of such metals in a binder resin; a layer in which such a metal or a dielectric multi-layer film is deposited by a suitable thin film forming method such as a vacuum evaporation method, a sputtering method, or the like; a reflection sheet having the above-mentioned coating or deposited layer supported by a base material composed of a film or the like; a sheet of metal foil; and so on.

The reflector to be formed may exhibit a light scattering function as described above. Reflected light is diffused by a scattering reflection surface so that the frontal directivity can be enhanced. In addition, when the surface of the reflector is roughened, production of Newton rings due to tight contact is prevented so that visibility can be improved. Therefore, the reflector to be provided outside the cell may be simply placed without adhesion or may be disposed closely by an adhering method, an evaporation method, or the like.

For example, the light scattering type reflector can be formed by: a surface roughening method using sandblasting, matting, or the like; a method in which the surface of a film base material or the like is formed into a fine prismatic structure by a suitable method such as a particle addition method or the like, and a reflector is provided on the film base material or the like so as to mirror the fine prismatic structure; and so on. The fine prismatic structure reflector to mirror the fine prismatic structure on the surface of the film base material can be formed by a method in which a metal is deposited on the surface of the film base material or the like by a suitable method, for example, an evaporation method such as a vacuum evaporation method, an ion plating method, a sputtering method, or the like, or a plating method.

When the liquid-crystal cell is formed, at least one suitable functional layer may be provided in accordance with necessity, such as: an aligned film composed of a film subjected to rubbing for aligning the liquid crystal; a color filter for color display; and so on. Incidentally, aligned films 25 and 41 are generally formed on the transparent electrodes 24, 42 and 44 as illustrated in FIGS. 1 and 2, and a color filter 23 is generally provided between one of the cell substrates 21 and 45 and a corresponding transparent electrode. In FIGS. 1 and 2, the color filter 23 is provided on the visual-side substrate 21.

In the liquid-crystal display panel, the crystal cell maybe additionally provided with at least one suitable optical layer such as polarizers 12 and 15, phase retarders 13 and 14, light diffusing layers, and so on, as illustrated in FIGS. 1 and 2. The object of the polarizers is to attain display utilizing linearly polarized light, while the object of the phase retarders is to improve display quality through the compensation of a phase difference caused by the birefringence of the liquid crystal, or the like. On the other hand, the objects of the light diffusing layers are: enlargement of the display are a by diffusing display light; uniformity of luminance by leveling emission-line-like emission light by means of the optical path changing slopes of the optical path control layer; increase in the quantity of light incident on the optical path control layer by diffusing transmitted light in the liquid-crystal display panel; and so on.

As the polarizer, any suitable plate may be used without any specific limitation. From the point of view of obtaining display with a good contrast ratio based on the entrance of highly linearly polarized light, it is possible to preferably use a polarizer with a high degree of polarization, for example, such as: an absorption type polarizing film formed in such a manner that a dichromatic substance such as iodine or dichromatic dye is absorbed into a hydrophilic polymeric film such as a polivinyl alcohol film, a partially formalized polivinyl alcohol film, or a partially saponified ethylene-vinyl acetate copolymer film, and then the film which has absorbed the dichromatic substance is drawn to extend; a polarizing film in which a transparent protective layer is provided on one side or both sides of the aforementioned absorption type polarizing film; or the like.

A material excellent in transparency, mechanical strength, thermal stability, moisture sealability, and so on, is preferably used for the formation of the aforementioned transparent protective layer. Examples of the material may include: polymer such as acetate resin, polyester resin, polyether sulfone resin, polycarbonate resin, polyamide resin, polyimide resin, polyolefin resin, acrylic resin, polyether resin, polyvinyl chloride resin, styrene resin, or norbornane resin; thermoset or ultraviolet-curing resin such as acrylic resin, urethane resin, acrylic-urethane resin, epoxy resin, silicon resin, or the like; etc. The transparent protective layer may be attached by a bonding method in the form of a film, or by a coating method in the form of a polymer solution or the like, etc. Incidentally, such a polarizer may be provided on each of the sides of the liquid-crystal cell as illustrated in FIG. 2, or only one side of the liquid-crystal cell as illustrated in FIG. 1.

On the other hand, the phase retarder may be formed by use of a suitable plate, such as: a birefringent film obtained in such a manner that a film composed of any suitable polymer as listed above in the case of the aforementioned transparent protective layer is drawn to extend by a suitable method such as uniaxal or biaxial drawing method, or the like; an aligned film of suitable nematic or discotic liquid-crystal polymer or the like; such an aligned film in which the aligned layer is supported by a transparent substrate; or the like. Alternatively, the phase retarder may be a heat-shrinkable film the thickness-direction refractive index of which is controlled under the effect of shrinkage by heating. The compensating phase retarders 13 and/or 14 are generally disposed between the visual-side and/or back-side polarizers 12 and/or 15 and the liquid-crystal cell in accordance with necessity as illustrated in FIGS. 1 and 2. As the phase retarders, suitable plates may be used in accordance with the wavelength range or the like. In addition, each of the phase retarders may be used in the form of two or more layers so as to be superposed on each other in order to control optical properties such as a phase difference or the like.

The illuminator disposed on the side surface of the liquid-crystal display panel is provided so that light used as illumination light for the reflection type liquid-crystal display device is made incident on the side surface of the liquid-crystal display panel. Thus, reduction in thickness and weight of the reflection type liquid-crystal display device can be attained by combination of the illuminator with the optical path control layer disposed on the visual side of the panel. From the point of view of preventing incident light from the illuminator from entering the liquid-crystal layer, there is a preferable method in which the illuminator is disposed on the side surface of the visual-side substrate as described above, especially on the side surface of the visual-side substrate which is protruded more greatly than the side surface of the back-side substrate.

A suitable material may be used as the illuminator. Preferable examples of the material may include: a linear light source such as a (cold or hot) cathode-ray tube or the like; a point light source such as a light emission diode or the like; an array in which such point light sources are set in a linear or planar array or the like; a combination of a point light source and a linear light pipe through which incident light from the point light source is converted into a linear light source; and so on. As shown in FIGS. 1 and 2, the illuminators 51 and 53 may be disposed on at least one side surface of the liquid-crystal display panel. In the case where illuminators are disposed on two or more side surfaces, the side surfaces maybe used as a combination of opposite side surfaces as shown in FIG. 2, or as a combination of side surfaces intersecting lengthwise and crosswise, or as a combination of three or more side surfaces using both the aforementioned combinations.

Switching on the illuminator allows visual recognition in the illumination mode. When visual recognition is made in the external light mode, it is unnecessary to switch on the illuminator. Therefore, the illuminator is made switchable on/off. As the switching method, a suitable method may be adopted, or any background-art method may be adopted. Incidentally, the illuminator may be of a multi-color light emission system which can change over between emission colors. Alternatively, lights with different colors may be emitted from different kinds of illuminators.

In accordance with necessity, as illustrated in FIG. 1 (FIG. 2), the illuminator 51 (51, 53) maybe formed in a combined body in which suitable assisting means such as a light source holder 52 (52, 54) for surrounding the illuminator to guide divergent light to the side surface of the liquid-crystal display panel. As the light source holder, a suitable reflective sheet which can reflect at least the light from the illuminator may be used. As the reflective sheet, it is possible to use a resin sheet provided with a high reflectance metal thin film, a white sheet, a metal foil sheet, or the like. The light source holder may be used as a retaining means also having a function of surrounding the illuminator in such a manner that end portions of the light source holder are bonded to end portions of upper and lower surfaces of the cell substrate of the liquid-crystal display panel, especially to end portions of upper and lower surfaces of the visual-side substrate.

The optical path control layer is provided for the following object. That is, the optical path of the incident light from the illuminator 51 disposed on the side surface of the liquid-crystal display panel as illustrated in FIG. 1, or the optical path of the transmitted light of the incident light is changed toward the back-side substrate of the panel through the optical path changing slopes A1, and the light is reflected/inverted by the reflector 42 so as to be used as illumination light (display light). The optical path control layer is disposed outside the visual-side substrate 21 of the liquid-crystal display panel and generally disposed on the visual-side surface portion.

In order to achieve the aforementioned object, the optical path control layer 11 is provided with optical path changing slopes A1 each inclined at an inclination angle in a range of from 35 to 48 degrees with respect to a reference plane (virtual horizontal plane) of the visual-side substrate in order so that the incident light from the illuminator 51 (51, 53) is reflected to thereby change the optical path of the light into a predetermined direction as illustrated in FIG. 1 (FIG. 2). The optical path control layer has a repetitive structure of the optical path changing slopes for the purpose of attaining reduction in its thickness. The optical path control layer is formed as a layer having a refractive index higher than that of the low-refractive-index transparent layer provided on the visual-side substrate. If the refractive index of the optical path control layer is lower than that of the transparent layer, the incident light from the illuminator or the transmitted light thereof is apt to be enclosed by the visual-side substrate. As a result, incidence of light onto the optical path control layer is disturbed so that the light can hardly be used as display light.

The optical path control layer can be formed as a layer having any suitable form except that the optical path control layer has such a repetitive structure of the predetermined optical path changing slopes. From the point of view of changing the optical path of the light to obtain display light excellent in frontal directivity, the optical path control layer is preferably provided as an optical path control layer having a repetitive structure of a plurality of optical path changing means A with optical path changing slopes A1 facing the side surface where the illuminator is disposed, that is, facing the incidence side surface, and more preferably provided as an optical path control layer having a repetitive structure of a plurality of optical path changing means A which have optical path changing slopes A1 and which are formed into prism-like structures.

Figure 3A:
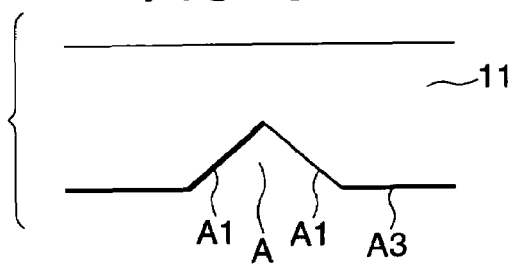
FIGS. 3A to 3E are side views for explaining optical path changing means in an optical path control layer.
Figure 3B:
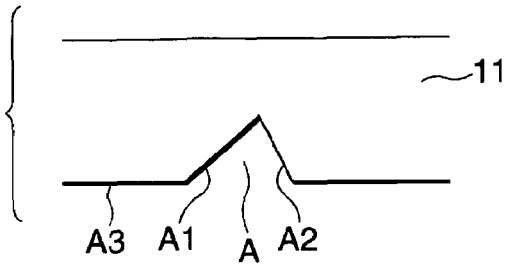
Figure 3C:
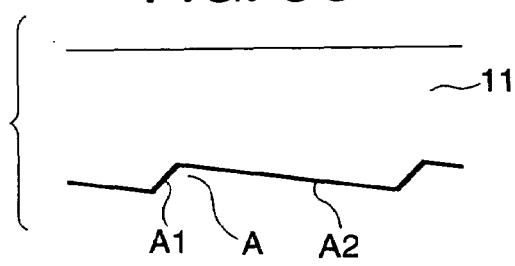
Figure 3D:
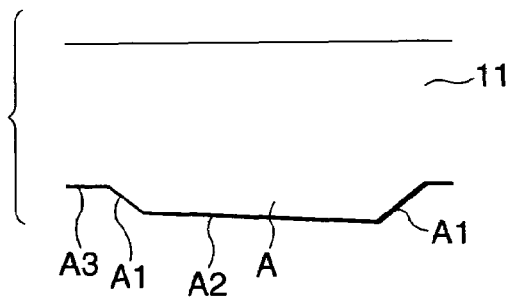
Figure 3E:
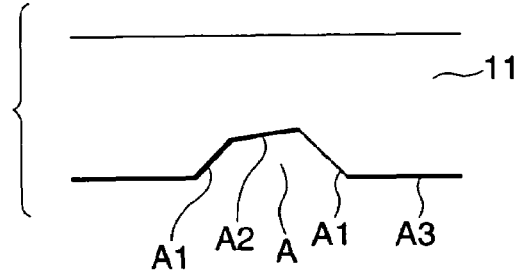

FIGS. 3A to 3E show examples of the plurality of optical path changing means A with the optical path changing slopes or prism-like structures described above. In FIGS. 3A to 3C, each of the optical path changing means A is shaped substantially like a triangle in section. In FIGS. 3D and 3E, it is shaped substantially like a quadrangle in section. In addition, in FIG. 3A, each of the plurality of optical path changing means A has two optical path changing slopes A1 constituted by two equal sides of an isosceles triangle. In FIG. 3B, each of the plurality of optical path changing means A has an optical path changing slope A1, and a steep slope A2 having a larger inclination angle than that of the slope A1 with respect to the reference plane. On the other hand, in FIG. 3C, each of the plurality of optical path changing means A has an optical path changing slope A1, and a gentle slope A2 having a smaller inclination angle than that of the slope A1. In addition, a repetitive structure in which the plurality of optical path changing means A are continuously adjacent to one another is formed all over the one side surface of the optical path control layer. In FIG. 3D, the plurality of optical path changing means A are constituted by convex portions (protrusions). In FIG. 3E, the plurality of optical path changing means A are constituted by concave portions (grooves).

As the examples described above, therefore, the plurality of optical path changing means may be constituted by convex or concave portions each made of equilateral sides or slopes with equal inclination angles, or may be constituted by convex or concave portions each made of a combination of an optical path changing slope and a steep or gentle slope or slopes different in inclination angle. The format of the slopes may be determined suitably in accordance with the number and positions of side surfaces where light is made incident. From the point of view to improve mar-proofness to maintain the function of the slopes, it is favorable to form the plurality of optical path changing means into concave portions rather than convex portions because the slopes, or the like, in the concave portions are rarely damaged.

From the point of view to attain the aforementioned characteristic such as frontal directivity, or the like, it is preferable that the optical path control layer has the optical path changing slopes A1 each of which has an inclination angle in a range of from 35 to 48 degrees with respect to the reference plane and which face the side surface where light is incident, as illustrated in FIGS. 3A to 3E. Therefore, when illuminators are disposed on two or more side surfaces of the liquid-crystal display panel so that two or more incidence side surfaces are provided, it is preferable to use an optical path control layer having optical path changing slopes A1 formed in accordance with the number and positions of the side surfaces.

Incidentally, in the case where illuminators 51 and 53 are disposed on two opposite side surfaces of the liquid-crystal display panel as illustrated in FIG. 2, it is preferable to use an optical path control layer 11 having two optical path changing slopes A1 provided in the following manner. That is, as shown in FIG. 3A, the ridgelines of the two optical path changing slopes A1 of each optical path changing means A which is shaped substantially like an isosceles triangle in section go parallel with the aforementioned side surfaces. Alternatively, as shown in FIGS. 3D and 3E, the ridgelines of the two optical path changing slopes A1 of each optical path changing means A which is shaped substantially like a trapezoid in section go parallel with the incidence side surfaces. On the other hand, in the case where illuminators are disposed on two side surfaces of the liquid-crystal display panel which intersect lengthwise and crosswise, it is preferable to use an optical path control layer which has optical path changing slopes A1 the ridgelines of which go parallel with the two lengthwise and crosswise directions correspondingly to the side surfaces. Further, in the case where illuminators are disposed on three or more side surfaces including opposite side surfaces and lengthwise and crosswise side surfaces, it is preferable to use an optical path control layer having optical path changing slopes A1 constituted by the combination of the aforementioned slopes.

The aforementioned optical path changing slopes A1 play the following role. That is, of the light incident on the side surfaces from the illuminators and the transmitted light of the incident light, the slopes A1 reflect the light incident thereon to change the optical path of the light to thereby supply the light to the back side of the liquid-crystal display panel. In this case, the inclination angle of the optical path changing slopes A1 with respect to the reference plane is set to be in a range of from 35 to 48 degrees. Thus, as represented by the broken-line arrow in FIG. 1, the optical path of the light incident on the side surfaces or transmitted light thereof can be changed with good perpendicularity to the reference plane so that display light excellent in frontal directivity can be obtained efficiently. If the aforementioned inclination angle is smaller than 35 degrees, the optical path of the light reflected by the reflector is displaced largely from the frontal direction. Thus, it is difficult to use the reflected light effectively for display, and the frontal luminance becomes low. On the contrary, if the inclination angle exceeds 48 degrees, light leaking from the optical path changing slopes increases due to the contrariety to the condition that light incident on the side surfaces or transmitted light thereof is totally reflected. Thus, the efficient utilization of the light incident on the side surfaces is deteriorated.

From the point of view of changing the optical path with excellent frontal directivity, restraining light from leaking, or the like, the inclination angle of the optical path changing slopes A1 is preferably in a range of from 38 to 45 degrees, more preferably in a range of from 40 to 44 degrees in consideration of the total reflection conditions based on the refraction of the transmitted light in the liquid-crystal display panel in accordance with Snell's law, and so on. Incidentally, the total reflection condition of a glass plate is generally 42 degrees. In this case, light incident on the side surface is incident on the optical path changing slopes while the light is transmitted in a state in which the light is condensed in a range of ±42 degrees.

The plurality of optical path changing means A having the optical path changing slopes A1 are formed as a repetitive structure as illustrated in FIGS. 4, 5 and 6 in order to reduce the thickness of the optical path control layer as described above. In this case, from the point of view of reflecting light incident on one side surface backward and efficiently transmitting the reflected light to a side surface opposite to the aforementioned back side surface, as represented by $\alpha2$ in FIG. 1, so as to emit the light on the whole surface of the liquid-crystal display as uniformly as possible, the structure is preferably formed as a structure including gentle slopes A2 each inclined at an inclination angle of not larger than 10 degrees, especially not larger than 5 degrees, more especially not larger than 3 degrees with respect to the reference plane, or including flat surfaces A3 each inclined at an inclined angle of substantially 0 degree with respect to the reference plane as shown in FIGS. 3A to 3E by way of example. It is therefore preferable that the plurality of optical path changing means A including the steep slopes A2 illustrated in FIG. 3B have a structure in which the inclination angle of the steep slopes A2 is set to be not smaller than 35 degrees, particularly not smaller than 50 degrees, more particularly not smaller than 60 degrees with respect to the reference plane, so that the width of the flat surfaces A3 can be enlarged.

The aforementioned gentle slopes A2 or flat surfaces A3 can be made to function as incidence portions on which light in an illumination mode and external light in an external light mode are incident and as the transmission portions through which the display light $\alpha$1 of the incident light in the illumination mode and the display light $\beta$ of the incident light in the external light mode reflected by the reflector 42 are transmitted, as illustrated in FIG. 1. Thus, a reflection type liquid-crystal display device which can be used both in an external light mode and in an illumination mode is achieved. In this case, particularly when the optical film has a repetitive structure of the plurality of optical path changing means A each constituted by the slopes A1 and A2 and repeated adjacently to one another as shown in FIG. 3C, it is preferable that any difference in inclination angle with respect to the reference plane between the gentle slopes A2 in the whole of the optical path control layer is set to be not larger than 5 degrees, especially not larger than 4 degrees, more especially not larger than 3 degrees. Further, it is preferable that any difference in inclination angle between two gentle slopes adjacent to each other is set to be not larger than 1 degree, especially not larger than 0.3 degree, more especially not larger than 0.1 degree. This difference setting is to prevent the optimum viewing direction of the reflection type liquid-crystal display device, especially the optimum viewing direction in a neighbor of the frontal direction from changing largely because of transmission of the light through the gentle slopes A2, and particularly to prevent the optimum viewing direction from changing largely between adjacent gentle slopes. In addition, from the point of view of obtaining bright display in the external light mode, it is preferable that the projected area of the gentle slopes A2 on the reference plane is set to be not smaller than 5 times, especially not smaller than 10 times, more especially not smaller than 15 times as large as that of the optical path changing slopes A1. This projected area setting is to improve the incidence efficiency of external light and the transmission efficiency of the display light reflected by the reflector.

The plurality of optical path changing means A are provided so that their ridgelines go parallel with or are inclined to the incidence side surface of the liquid-crystal display panel on which the illuminator 51 is disposed as illustrated in FIGS. 4 to 6. In this case, the plurality of optical path changing means A may be formed continuously from one end of the optical path control layer to the other end as illustrated in FIGS. 4 and 5, or may be formed discontinuously and intermittently as illustrated in FIG. 6. When the optical path changing means A are formed discontinuously, it is preferable that the length of prismatic structures, which are constituted by grooves or protrusions, in the direction along the incidence side surface is made not smaller than 5 times as long as the depth or height of the prismatic structures from the point of view of the incidence efficiency or the optical path changing efficiency of the transmitted light, or the like. In addition, it is preferable that the aforementioned length is set to be not larger than 500 µm, especially in a range of from 10 to 480 µm, more especially in a range of from 50 to 450 µm, from the point of view of uniform light emission on the display surface of the panel.

There is no specific limit on the sectional shape of the optical path changing means A or the repetitive pitch of the optical path changing slopes A1. The optical path changing slopes A1 are luminance-determining factors in the illumination mode. Therefore, the number of the optical path changing slopes A1 can be determined suitably in accordance with the uniformity of light emission on the display surface of the panel in the illumination mode or in the external light mode. Thus, the quantity of optical-path-changed light can be controlled by the distribution density of the optical path changing slopes A1. Accordingly, the slopes A1, A2, etc. may have a shape with a fixed inclination angle, or the like, all over the surface of the optical path control layer. Alternatively, in order to cope with absorption loss or attenuation of the transmitted light because of previous changing of its optical path and uniformalize light emission on the display surface of the panel, the optical path changing means A may be made larger as it goes farther from the side surface where light is incident, as illustrated in FIG. 7.

Figure 7:
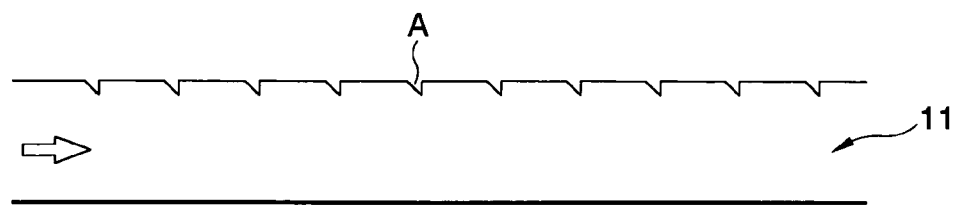
FIG. 7 is a side view for explaining an example of the optical path control layer.
Figure 8:
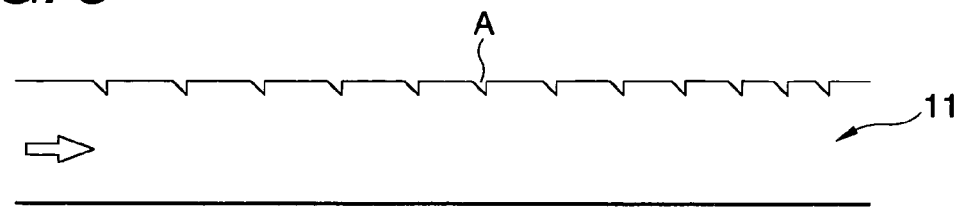
FIG. 8 is a side view for explaining another example of the optical path control layer.

Further, the plurality of optical path changing means A may be made to have a fixed pitch as illustrated in FIG. 7, or may be made to have a pitch which is reduced gradually to thereby increase the distribution density of the optical path changing means A as it goes farther from the side surface where light is incident as illustrated in FIG. 8. Further, uniform light emission may be attained on the display surface of the panel by a random pitch. In addition, when the optical path changing means A are made of prismatic structures constituted by discontinuous grooves or protrusions, the size, the shape, the distribution density, the ridgeline direction, etc. of the prismatic structures may be made irregular, or the irregular or regular or standardized prismatic structures maybe arranged at random so that uniform light emission on the display surface of the panel can be attained. Hence, uniform light emission on the display surface of the panel can be achieved by application of a suitable method to the optical path changing means A as described above by way of example. Incidentally, the arrow direction in FIGS. 7 and 8 designates the direction of transmission of the light incident on the side surface.

Incidentally, when the optical path changing slopes A1 overlap with pixels of the liquid-crystal cell, display may become unnatural due to insufficient transmission of display light. From the point of view to prevent such insufficiency, it is preferable that the overlapping area is made as small as possible, so as to ensure sufficient light transmittance through the gentle slopes A2 or the flat surfaces A3. In consideration of not only such a point but also the fact that the pixel pitch of the liquid-crystal cell is generally in a range of from 100 to 300 µm, it is preferable that the optical path changing slopes A1 are formed so that the projected width thereof on the reference plane is not larger than 40 µm, especially in a range of from 3 to 20 µm, more especially in a range of from 5 to 15 µm. Since the coherence length of a fluorescent tube is generally set to be about 20 µm, such a projected width is preferable also from the point of view to prevent the display quality from deterioration due to diffraction.

On the other hand, from the aforementioned point of view, it is preferable that the optical path changing slopes A1 have large intervals. However, the optical path changing slopes A1 function as substantial portions for forming illumination light by changing of the optical path of light incident on the side surface as mentioned above. Accordingly, if the interval is too wide, illumination is sparse at the time of switching on the illuminator so that display may be unnatural. In consideration of these facts, it is preferable that the repetitive pitch of the optical path changing slopes A1 is set to be not larger than 5 mm, especially in a range of from 20 µm to 3 mm, more especially in a range of from 50 µm to 2 mm.

When the plurality of optical path changing means are formed into a repetitive prismatic structure, moire may occur because of interference between the optical path changing means and the pixels of the liquid-crystal cell. Although moire can be prevented by adjustment of the pitch in the repetitive structure, there is a preferable range in the pitch of the repetitive structure as mentioned above. Hence, countermeasures against the case where moire still occurs even if the pitch is in the aforementioned preferable range become a problem. According to the present invention, the prismatic structures are formed so that their ridgelines are inclined with respect to the incidence side surface. Thus, the repetitive prismatic structure can be arrayed across the pixels so as to prevent moire. In this case, if the inclination angle with respect to the incidence side surface is too large, deflection may occur in reflection by the optical path changing slopes A1. As a result, large deviation may occur in the changed direction of the optical path. This is apt to cause lowering of display quality. Therefore, the inclination angle of the ridgelines of the prismatic structures with respect to the incidence side surface is preferably set to be in a range of ±30 degrees, more preferably in a range of ±25 degrees. Incidentally, the symbol "±" means the direction of inclination of the ridgelines with the incidence side surface as a reference. If the resolution of the liquid-crystal cell is low enough not to produce moire, or if moire is negligible, it is preferable that such ridgelines are formed to be as parallel with the incidence side surface as possible.

The optical path control layer can be made of a suitable material exhibiting transparency in accordance with the wavelength range of light from the illuminator and having a refractive index higher than that of the low-refractive-index transparent layer. Incidentally, examples of the material used in a visible light range may include polymer, curable resin, and glass, as described above in the description of the transparent protective layer by way of example. An optical path control layer made of a material exhibiting no birefringence or little birefringence is preferable. From the point of view of suppressing the quantity of loss light which is enclosed by the panel because of the aforementioned interface reflection so as to be unable to exit from the panel, and from the point of view of efficiently supplying light incident on the side surface or the transmitted light thereof to the optical path control layer, especially to the optical path changing slopes A1 of the optical path control layer, it is preferable that the optical path control layer has a refractive index higher by 0.05 or more, especially by 0.08 or more, more especially by a value of from 0.1 to 0.5 than that of the low-refractive-index transparent layer. In addition, from the point of view in which the incident light from the illuminator or the transmitted light thereof is made incident on the optical path control layer from the visual-side substrate efficiently so as to achieve bright display through the optical path changing slopes, it is preferable that the optical path control layer has such a refractive index that the refractive index difference between the optical path control layer and the visual-side substrate is not larger than 0.15, especially not larger than 0.10, more especially not larger than 0.05 and particularly the optical path control layer has a refractive index higher than that of the visual-side substrate.

The optical path control layer can be formed by a cutting method or by any suitable method. Preferable examples of the method for producing the optical path control layer from the point of view of mass production, or the like, may include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or radial rays or the like is polymerized in the condition that the fluid resin is cast in a mold capable of forming a predetermined shape or in the condition that the mold is filled with the fluid resin; or the like. Hence, the optical path control layer may be formed by adding the predetermined shape directly to the visual-side substrate, or the like, or may be formed as a transparent sheet, or the like, having the predetermined shape.

Although the thickness of the optical path control layer can be determined suitably, it is generally set to be not thicker than 300 μm, especially in a range of from 5 to 200 μm, more especially in a range of from 10 to 100 μm, from the point of view of reducing the thickness of the optical path control layer. Incidentally, when the optical path control layer is formed independently as a transparent sheet, or the like, it is preferable that the transparent sheet, or the like, is bonded to the liquid-crystal display panel through an adhesive layer having a refractive index higher than that of the low-refractive-index transparent layer, especially an adhesive layer having a refractive index as equal to that of the transparent sheet as possible, more especially an adhesive layer having a refractive index between that of the transparent sheet and that of the visual-side substrate. In such a manner, the incident light, or the like, can be made efficiently incident from the visual-side substrate onto the optical path control layer so as to achieve bright display. Hence, the refractive index of the adhesive layer can be set in accordance with the optical path control layer.

The adhesive layer can be made of any suitable transparent adhesive agent without any specific limitation in kind. A bonding method by use of a tacky layer is preferable from the point of view of easiness of the bonding treatment, or the like.

The tacky layer is preferably formed of an adhesive agent, or the like, using suitable polymer as base polymer, for example, rubber, acrylic, vinyl-alkyl ether, silicon, polyester, polyurethane, polyether, polyamide, styrene, etc. Especially, it is preferable to use an adhesive agent superior in transparency, weatherability, heat resistance, and so on, such as an acrylic adhesive agent in which polymer mainly containing acrylic or methacrylic alkyl ester is used as base polymer.

The optical path control layer is disposed on the visual side of the liquid-crystal display panel. In this case, it is preferable that the slope-forming surface of the optical path control layer, that is, the surface where the plurality of optical path changing means A are formed, is disposed on the outer side (visual side) as illustrated in FIGS. 1 and 2, from the point of view of the efficiency of reflection by the optical path changing slopes A1 of the plurality of optical path changing means A and, accordingly, improvement of luminance based on efficient utilization of light incident on the side surface, and so on.

The outer surface of the optical path control layer may be subjected to a non-glare treatment or an anti-reflection treatment in order to prevent obstruction to visual recognition from being caused by surface reflection of external light. The non-glare treatment may be done by making the surface have a fine prismatic structure by various methods such as: a surface roughing method of sandblasting, embossing or the like; a loading method of transparent particles of silica or the like; etc. The anti-reflection treatment may be done by a method for forming a coherent vapor-deposited film, or the like. Alternatively, the non-glare or anti-reflection treatment may be done by a method for bonding a film having such a fine prismatic surface structure or such a coherent film to the surface of the optical path control layer, or the like.

As described above, a light-diffusing layer may be disposed in the reflection type liquid-crystal display device according to the present invention. The light-diffusing layer can be provided by a suitable method such as by forming a coating layer, a diffusing sheet, or the like, having a fine prismatic surface structure similar to the aforementioned non-glare layer. Although the position of arrangement of the light-diffusing layer can be determined suitably, it is generally preferable that the light-diffusing layer is disposed between the optical path control layer and the visual-side substrate from the point of view of stability of display quality, or the like. In this case, in order to attain reduction in thickness of the liquid-crystal display device, the light-diffusing layer may be formed as a light diffuse type adhesive layer containing transparent particles so that the light-diffusing layer serves also as an adhesive layer for bonding the transparent sheet of the optical path control layer or as an adhesive layer for bonding a polarizer and a phase retarder to each other. Hence, one light-diffusing layer may be disposed or two or more light-diffusing layers may be disposed.

Incidentally, as the transparent particles contained in the adhesive layer, one or two kinds of suitable transparent particles may be selected from inorganic particles, such as silica, alumina, titania, zirconia, tin oxide, indium oxide, cadmium oxide, antimony oxide or the like; or from organic particles such as crosslinked or non-crosslinked polymer or the like. The inorganic particles have an average size in a range of from 0.5 to 20 μm and may be electrically conductive.

In the reflection type liquid-crystal display device according to the present invention, a larger part of the light incident on the incidence side surface is transmitted backward through reflection through the liquid-crystal display panel, especially through the visual-side substrate of the liquid-crystal display panel in accordance with the law of refraction. Hence, while light is prevented from exiting (leaking) from the surface of the panel, the optical path of the light incident on the optical path changing slopes A1 of the optical path control layer is efficiently changed to the backward direction with good perpendicular directivity. The other part of the transmitted light is further transmitted backward by total reflection so as to be incident on the optical path changing slopes A1. Hence, the optical path of the other part of the transmitted light is efficiently changed to the backward direction with good perpendicular directivity. As a result, display excellent in uniformity of brightness on the whole display surface of the panel can be achieved. Accordingly, there can be formed a reflection type liquid-crystal display device which can be used both in an external light mode and in an illumination mode by using light from the illuminator or external light efficiently, and which is bright, easy to view and excellent in display quality.

Incidentally, according to the present invention, optical devices or parts such as an optical path control layer, a liquid-crystal cell, a polarizer, a phase retarder, etc. for forming the reflection type liquid-crystal display device may be wholly or partially integrally laminated/fixed onto one another or may be disposed to be separable easily from one another. From the point of view of prevention of lowering of contrast based on suppression of interface reflection, or the like, it is preferable that such optical devices or parts are fixed onto one another. A suitable transparent adhesive layer made of an adhesive agent or the like can be used for the fixing/adhering process. The transparent adhesive layer may contain the aforementioned transparent particles so that the adhesive layer exhibits a diffusing function, or the like. In addition, the aforementioned optical devices or parts, particularly those on the visual side may be made to have ultraviolet absorbing ability, for example, by a method of treating them with an ultraviolet absorbing agent such as salicylic ester compound, benzophenone compound, benzotriazole compound, cyanoacrylate compound, nickel complex compound, or the like.

EXAMPLES

Reference Example 1

Magnesium fluoride was applied onto a non-alkali glass plate having a thickness of 0.7 mm and a refractive index of 1.52 by vacuum evaporation to thereby form a low-refractive-index transparent layer having a thickness of 600 nm and a refractive index of 1.38 on the non-alkali glass plate. Red, blue and green stripe-like color filter layers and an ITO transparent electrically conductive layer were successively formed on the low-refractive-index transparent layer. Then, the transparent electrode thereof was divided by etching and a polyvinyl alcohol solution was applied thereon by spin coating. The dried film obtained thus was subjected to a rubbing treatment. Thus, a visual-side substrate was obtained. On the other hand, an ultraviolet-curable resin layer was formed on a non-alkali glass plate in the same manner as described above. After the ultraviolet-curable resin layer was subjected to a surface-roughening treatment, aluminum vapor was deposited on the ultraviolet-curable resin layer to thereby form a diffuse reflection type electrode. A rubbing film was provided on the electrode in the same manner as described above. Thus, a back-side substrate was obtained.

Then, a gap adjusting material was disposed while the visual-side substrate and the back-side substrate were disposed to be opposite to each other so that the rubbing directions of the respective rubbing surfaces of the two substrates crossed each other perpendicularly. After the periphery of the two substrates was sealed with an epoxy resin, liquid crystal (ZLI-4792, made by MERCK & CO., INC.) was injected between the two substrates to thereby form a TN reflection type liquid-crystal cell. Polarizers (NPF EGW1225DU, made by NITTO DENKO CORPORATION) subjected to an anti-reflection treatment and a non-glare treatment were stuck onto opposite surfaces of the liquid-crystal cell. Thus, a normally white reflection type liquid-crystal display panel was obtained. The size of the panel was 45 mm wide and 34 mm long. One side surface of the visual-side substrate in the direction of the length of the panel was protruded outward by 2 mm from that of the back-side substrate. Then, a cold-cathode tube was disposed on the protruded side surface of the visual-side substrate and surrounded by a silver-vapor-deposited polyester film. End portions of the film were bonded to upper and lower surfaces of the substrates by a double-side adhesive tape so that the cold-cathode tube was held and fixed.

Reference Example 2

A normally white reflection type liquid-crystal display panel provided with a cold-cathode tube held on one of side surfaces of the panel was obtained in the same manner as in Reference Example 1 except that the thickness of the low-refractive-index transparent layer made of magnesium fluoride was changed to 300 nm.

Reference Example 3

A normally white reflection type liquid-crystal display panel provided with a cold-cathode tube held on one of side surfaces of the panel was obtained in the same manner as in Reference Example 1 except that the thickness of the low-refractive-index transparent layer made of magnesium fluoride was changed to 100 nm.

Reference Example 4

A normally white reflection type liquid-crystal display panel provided with a cold-cathode tube held on one of side surfaces of the panel was obtained in the same manner as in Reference Example 1 except that the low-refractive-index transparent layer made of magnesium fluoride was not provided on the visual-side substrate.

Reference Example 5

A normally white reflection type liquid-crystal display panel provided with cold-cathode tubes held on two of side surfaces of the panel was obtained in the same manner as in Reference Example 1 except that the size of the panel was changed to a size of 45 mm wide and 36 mm long so that opposite side surfaces of the visual-side substrate in the lengthwise direction were protruded outward by 2 mm from those of the back-side substrate.

Reference Example 6

A normally white reflection type liquid-crystal display panel provided with cold-cathode tubes held on two of side surfaces of the panel was obtained in the same manner as in Reference Example 5 except that the low-refractive-index transparent layer made of magnesium fluoride was not provided on the visual-side substrate.

Reference Example 7

An acrylic ultraviolet-curable resin (ARONIX UV-3701 made by TOAGOSEI CHEMICAL INDUSTRY CO., LTD.)

was dropped by a dropper so that a mold processed into a predetermined shape in advance was filled with the acrylic ultraviolet-curable resin. A triacetylcellulose (TAC) film (having a saponified surface and a refractive index of 1.49) having a thickness of 80 μm was quietly set on the acrylic ultraviolet-curable resin and then stuck closely thereto by a rubber roller so that a surplus of the resin and air bubbles were removed. Then, the acrylic ultraviolet-curable resin was irradiated with ultraviolet rays by a metal halide lamp so that the resin was cured. Then, the resin was peeled off from the mold and cut into a predetermined size. Thus, a transparent sheet having an optical path control layer having a refractive index of 1.51 was obtained. A tacky layer having a refractive index of 1.47 was attached to a surface of the transparent sheet where the optical path control layer was not provided.

Incidentally, the transparent sheet was 40 mm wide and 30 mm long. The transparent sheet had prism-like concave portions disposed continuously at intervals of a pitch of 210 μm and having ridgelines inclined at an angle of 21 degrees in the widthwise direction (FIG. 3C). Each of the prism-like concave portions had an optical path changing slope A1 and a gentle slope A2. The inclination angle of each of the optical path changing slopes A1 was 42 degrees. The inclination angle of each of the gentle slopes A2 varied in a range of from 1.8 to 3.5 degrees. The difference between the inclination angles of adjacent ones of the gentle slopes A2 was not larger than 0.1 degree. The projected width of each of the optical path changing slopes A1 on a reference plane was in a range of from 10 to 16 μm. The ratio of the projected area of the gentle slopes on the reference plane to the projected area of the optical path changing slopes on the reference plane was not smaller than 12.

Reference Example 8

An optical path control layer having a refractive index of 1.51 was formed in the same manner as in Reference Example 7 except that the TAC film was replaced by a polycarbonate film having a thickness of 60 μm. The optical path control layer was peeled off from the polycarbonate film. Thus, a transparent sheet serving as the optical path control layer itself was obtained. A tacky layer having a refractive index of 1.51 was attached to a surface of the transparent sheet where the optical path control layer was not provided. Incidentally, the transparent sheet was 40 mm wide and 30 mm long. The transparent sheet had prism-like concave portions disposed continuously at intervals of a pitch of 210 μm and having ridgelines inclined at an angle of 21 degrees in the widthwise direction (FIG. 3B) Each of the prism-like concave portions had an optical path changing slope A1 and a steep slope A2. The inclination angle of each of the optical path changing slopes A1 was 42 degrees. The vertical angle between the optical path changing slope A1 and the steep slope A2 was 70 degrees. The projected width of each of the optical path changing slopes A1 on a reference plane was in a range of from 10 to 16 μm. The projected area of the flat portions A3 on the reference surface was not smaller than 10 times as large as the total projected area of the optical path changing slopes A1 and the steep slopes A2 on the reference plane.

Reference Example 9

A tacky-layer-including transparent sheet serving as an optical path control layer itself was obtained in the same manner as in Reference Example 8 except that another mold was used. The transparent sheet had a plurality of optical path changing means (FIG. 3B) each having a length of 80 μm. Each of the plurality of optical path changing means has an optical path changing slope A1 and a steep slope A2. The inclination angle of each of the optical path changing slopes A1 was about 42 degrees. The projected width of each of the optical path changing slopes A2 on a reference plane was 10 μm. The inclination angle of each of the steep slopes A2 was about 65 degrees. The lengthwise direction of the plurality of optical path changing means was parallel to an incidence side surface. The optical path changing means were disposed so that they became gradually dense as they went farther from the incidence side surface in the widthwise direction (FIGS. 6 and 8). The projected area of the flat portions A3 on the reference surface was not smaller than 10 times as large as the total projected area of the optical path changing slopes A1 and the steep slopes A2 on the reference plane.

Reference Example 10

A tacky-layer-including transparent sheet serving as an optical path control layer itself was obtained in the same manner as in Reference Example 9 except that a further mold was used. The transparent sheet had a plurality of optical path changing means (FIG. 3A) having a length of 80 μm. Each of the optical path changing means was shaped like an isosceles triangle having optical path changing slopes A1 as its equal sides. The inclination angle of each of the optical path changing slopes A1 was about 42 degrees. The projected width of each of the optical path changing slopes A1 on a reference plane was 10 μm. The lengthwise direction of the optical path changing means was parallel to an incidence side surface. The optical path changing means were disposed at random so that they became gradually dense as they went from the incidence side surface to the center portion of the transparent sheet in the widthwise direction (FIG. 6). The projected area of the flat portions A3 on the reference surface was not smaller than 10 times as large as the total projected area of the optical path changing slopes A1 on the reference plane.

Reference Example 11

A tacky-layer-including transparent sheet serving as an optical path control layer itself was obtained in the same manner as in Reference Example 8 except that the surface of the mold was roughened by sandblasting.

Reference Example 12

A tacky-layer-including transparent sheet serving as an optical path control layer itself was obtained in the same manner as in Reference Example 8 except that a further mold was used. The transparent sheet had prism-like concave portions disposed continuously at intervals of a pitch of 210 μm (FIG. 3B). Each of the prism-like concave portions is constituted by an optical path changing slope A1 and a steep slope A2. The inclination angle of the optical path changing slope A1 was 30 degrees. The vertical angle between the optical path changing slope A1 and the steep slope A2 was 70 degrees. The projected width of each of the optical path changing slopes A1 on a reference plane was in a range of from 10 to 16 μm. The projected area of the flat portions A3 on the reference plane was not smaller than 10 times as large as the total projected area of the optical path changing slopes A1 and the steep slopes A2 on the reference plane.

Example 1

A transparent sheet obtained in Reference Example 7 was bonded to a visual side surface of a reflection type liquid-crystal display panel obtained in Reference Example 1 through the tacky layer of the transparent sheet. Thus, a reflection type liquid-crystal display device capable of being used both in an external light mode and in an illumination mode was obtained.

Comparative Example 1

A transparent sheet obtained in Reference Example 7 was bonded to a visual side surface of a reflection type liquid-crystal display panel obtained in Reference Example 4 through the tacky layer of the transparent sheet. Thus, a reflection type liquid-crystal display device capable of being used both in an external light mode and in an illumination mode was obtained.

Example 2

A transparent sheet obtained in Reference Example 8 was bonded to a visual side surface of a reflection type liquid-crystal display panel obtained in Reference Example 1 through the tacky layer of the transparent sheet. Thus, a reflection type liquid-crystal display device capable of being used both in an external light mode and in an illumination mode was obtained.

Example 3

A transparent sheet obtained in Reference Example 8 was bonded to a visual side surface of a reflection type liquid-crystal display panel obtained in Reference Example 2 through the tacky layer of the transparent sheet. Thus, a reflection type liquid-crystal display device capable of being used both in an external light mode and in an illumination mode was obtained.

Example 4

A transparent sheet obtained in Reference Example 8 was bonded to a visual side surface of a reflection type liquid-crystal display panel obtained in Reference Example 3 through the tacky layer of the transparent sheet. Thus, a reflection type liquid-crystal display device capable of being used both in an external light mode and in an illumination mode was obtained.

Comparative Example 2

A transparent sheet obtained in Reference Example 8 was bonded to a visual side surface of a reflection type liquid-crystal display panel obtained in Reference Example 4 through the tacky layer of the transparent sheet. Thus, a reflection type liquid-crystal display device capable of being used both in an external light mode and in an illumination mode was obtained.

Comparative Example 3

A transparent sheet obtained in Reference Example 11 was bonded to a visual side surface of a reflection type liquid-crystal display panel obtained in Reference Example 1 through the tacky layer of the transparent sheet. Thus, a reflection type liquid-crystal display device capable of being used both in an external light mode and in an illumination mode was obtained.

Comparative Example 4

A transparent sheet obtained in Reference Example 12 was bonded to a visual side surface of a reflection type liquid-crystal display panel obtained in Reference Example 1 through the tacky layer of the transparent sheet. Thus, a reflection type liquid-crystal display device capable of being used both in an external light mode and in an illumination mode was obtained.

Example 5

A transparent sheet obtained in Reference Example 9 was bonded to a visual side surface of a reflection type liquid-crystal display panel obtained in Reference Example 1 through the tacky layer of the transparent sheet. Thus, a reflection type liquid-crystal display device capable of being used both in an external light mode and in an illumination mode was obtained.

Comparative Example 5

A transparent sheet obtained in Reference Example 9 was bonded to a visual side surface of a reflection type liquid-crystal display panel obtained in Reference Example 4 through the tacky layer of the transparent sheet. Thus, a reflection type liquid-crystal display device capable of being used both in an external light mode and in an illumination mode was obtained.

Example 6

A transparent sheet obtained in Reference Example 10 was bonded to a visual side surface of a reflection type liquid-crystal display panel obtained in Reference Example 5 through the tacky layer of the transparent sheet. Thus, a reflection type liquid-crystal display device capable of being used both in an external light mode and in an illumination mode was obtained.

Comparative Example 6

A transparent sheet obtained in Reference Example 10 was bonded to a visual side surface of a reflection type liquid-crystal display panel obtained in Reference Example 6 through the tacky layer of the transparent sheet. Thus, a reflection type liquid-crystal display device capable of being used both in an external light mode and in an illumination mode was obtained.

Evaluation Test

Frontal luminance in a position distanced by 5 mm from the incidence side surface, in the center portion and in a position distanced by 5 mm from the opposite side surface of the reflection type liquid-crystal display device obtained in each of Examples 1 to 6 and Comparative Examples 1 to 6 was measured in a dark room by a luminance meter (BM-7 made by TOPCON CORP.) while the cold-cathode tube was switched on in the condition that the liquid-crystal cell was supplied with no voltage. Further, display in an illumination mode was observed in a frontal direction, in a direction of 15 degrees on the incidence side surface side and in a direction of 15 degrees on the opposite side surface side. On this condition, display quality was evaluated. The case where the display device was bright and excellent in uniformity of brightness so that light was exited efficiently was evaluated as ○. The case where the display device was slightly inferior in brightness and uniformity of brightness was evaluated as Δ. The case where the display device was dark and uneven in brightness was evaluated as X.

Results of the measurement were shown in the following table.

| | Frontal Luminance (cd/m$^2$) | | |
|---|---|---|---|
| | Incidence Side Surface Portion | Center Portion | Opposite Side Surface Portion |
| Example 1 | 34 | 31 | 29 |
| Comparative Example 1 | 30 | 8 | 4 |
| Example 2 | 35 | 32 | 36 |
| Example 3 | 38 | 30 | 26 |
| Example 4 | 34 | 25 | 21 |
| Comparative Example 2 | 29 | 8 | 5 |
| Comparative Example 3 | 4 | 6 | 6 |
| Comparative Example 4 | 10 | 8 | 12 |
| Example 5 | 36 | 37 | 34 |
| Comparative Example 5 | 31 | 10 | 4 |
| Example 6 | 68 | 51 | 54 |
| Comparative Example 6 | 41 | 35 | 39 |

| | Display Quality | | |
|---|---|---|---|
| | Incidence Side Surface Side | Frontal Direction | Opposite Side Surface Side |
| Example 1 | ○ | ○ | ○ |
| Comparative Example 1 | X | X | X |
| Example 2 | ○ | ○ | ○ |
| Example 3 | Δ | ○ | ○ |
| Example 4 | Δ | Δ | ○ |
| Comparative Example 2 | X | X | X |
| Comparative Example 3 | X | X | X |
| Comparative Example 4 | X | X | Δ |
| Example 5 | ○ | ○ | ○ |
| Comparative Example 5 | X | X | X |
| Example 6 | ○ | ○ | ○ |
| Comparative Example 6 | X | Δ | X |

It is apparent from the table that bright and uniform display in an illumination mode was achieved in Examples 1 to 6 whereas vary dark or uneven display occurred in Comparative Examples 1 to 6. It is apparent from Examples 2, 3 and 4 that characteristic in the incidence side surface portion was improved and uniformity of brightness increased as the thickness of the low-refractive-index transparent layer increased. In Comparative Examples 1, 2, 5 and 6 in which no low-refractive-index transparent layer was provided in the display device, however, the device became dark suddenly as the viewing point went farther from the incidence side surface. It is found that the device was large in unevenness of brightness regarded as being caused by absorption in the color filter layer. As a result, in Comparative Examples 1, 2, 5 and 6, display was vary hard to view. According to the table, luminance seemed to be uniform in Comparative Example 6. However, when the viewing angle in the direction of the incidence side surface was changed, uniformity of luminance varied widely. As a result, in Comparative Example 6, display was very unnatural and hard to view. Luminance itself in Comparative Example 6 was also inferior to that in Example 6.

Further, in Comparative Example 3 in which the surface of the transparent sheet was roughened and in Comparative Example 4 in which the inclination angle of the prism slopes was small, display was dark because light was not exited effectively. The liquid-crystal display device obtained in each of Examples 1 to 6 was observed in the condition that the device was supplied with a voltage to perform display. As a result, either in an illumination mode or in an external light mode, good display was obtained without any specific problem. On the contrary, in Comparative Examples 1 to 6, there was no problem in an external light mode but display was hard to view in an illumination mode. It is found from the above description that a reflection type liquid-crystal display device good in display quality can be formed according to the present invention because reduction in thickness and weight is achieved by use of an optical path control layer while increase in volume and weight caused by use of a light pipe is avoided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflection type liquid-crystal display device, comprising:
    a reflection type liquid-crystal display panel including a liquid-crystal cell and a reflector, said liquid-crystal cell having a visual-side substrate, a back-side substrate and a liquid crystal, said visual-side substrate including a transparent substrate, a low-refractive-index transparent layer lower in refractive index than the transparent substrate, and a transparent electrode, said back-side substrate having an electrode, said liquid crystal being held between said visual-side and back-side substrates so that respective electrode sides of said visual-side and back-side substrates are disposed opposite to each other, said reflector being disposed on the back-side substrate side;
    at least one illuminator disposed on one of side surfaces of said transparent substrate of said visual-side substrate; and
    an optical path control layer distinct from said transparent substrate of said visual-side substrate and having a repetitive structure of optical path changing slopes on an outer side of said visual-side substrate and being higher in refractive index than said low-refractive-index transparent layer, each of said optical path changing slopes being inclined at an inclination angle in a range of from 35 to 48 degrees with respect to a reference plane of said visual-side substrate,
    wherein an incident light from said illuminator is transmitted to said optical path control layer through said visual-side substrate,
    wherein there is a difference in refractive index between the optical path control layer and the visual-side substrate not larger than 0.15, and
    wherein the optical path control layer has a refractive index higher by 0.05 or more than that of the low-refractive-index transparent layer.

2. A reflection type liquid-crystal display device according to claim 1, wherein said low-refractive-index transparent layer is disposed between said transparent substrate and said transparent electrode, and there is a difference in refractive index by 0.05 or more between said low-refractive-index transparent layer and said transparent substrate.

3. A reflection type liquid-crystal display device according to claim 1, wherein at least said visual-side substrate in said liquid-crystal cell is made of an optically isotropic material.

4. A reflection type liquid-crystal display device according to claim 1, wherein said liquid-crystal display panel further includes one or two polarizers disposed on one of or each of opposite sides of said liquid-crystal cell.

5. A reflection type liquid-crystal display device according to claim 4, wherein said liquid-crystal display panel further includes at least one layer of phase retarder disposed between said liquid-crystal cell and said polarizer.

6. A reflection type liquid-crystal display device according to claim 1, wherein: said optical path control layer is constituted by a repetitive structure of prism-like structures; and each of said optical path changing slopes in said optical path control layer faces said illuminator.

7. A reflection type liquid-crystal display device according to claim 6, wherein each of said prism-like structures in said optical path control layer is constituted by a concave portion shaped substantially like a triangle in section.

8. A reflection type liquid-crystal display device according to claim 7, wherein each of said prism-like concave portions is constituted by a continuous groove which extends from one end to the other end of said optical path control layer in a ridgeline direction parallel with or inclined to said side surface of said liquid-crystal display panel on which said illuminator is disposed.

9. A reflection type liquid-crystal display device according to claim 7, wherein said prism-like concave portions are constituted by discontinuous grooves each having a length not smaller than 5 times as large as a depth of said groove.

10. A reflection type liquid-crystal display device according to claim 9, wherein the length of each of said discontinuous grooves in said prism-like concave portions is approximately parallel to said side surface of said liquid-crystal display panel on which said illuminator is disposed.

11. A reflection type liquid-crystal display device according to claim 7, wherein said prism-like concave portions are constituted by discontinuous grooves disposed at random.

12. A reflection type liquid-crystal display device according to claim 6, wherein each of said prism-like structures in said optical path control layer is constituted by a concave or convex portion shaped, in section, substantially like a triangle or quadrangle having at least two optical path changing slopes facing said illuminator.

13. A reflection type liquid-crystal display device according to claim 12, wherein said illuminators are disposed on at least two of side surfaces of said liquid-crystal display panel.

14. A reflection type liquid-crystal display device according to claim 1, wherein said inclination angle of each of said optical path changing slopes in said optical path control layer is in a range of from 38 to 45 degrees.

15. A reflection type liquid-crystal display device according to claim 1, wherein said optical path control layer is made of a transparent sheet, and is bonded to said liquid-crystal display panel through an adhesive layer having a refractive index higher than that of said low-refractive-index transparent layer.

16. A reflection type liquid-crystal display device according to claim 15, wherein said adhesive layer is constituted by a tacky layer.

17. A reflection type liquid-crystal display device according to claim 15, wherein each of the refractive index of said optical path control layer and the refractive index of said adhesive layer is higher by 0.05 or more than that of said low-refractive-index transparent layer.

18. A reflection type liquid-crystal display device according to claim 1, wherein: at least one side surface of said visual-side substrate is protruded outward from that of said back-side substrate; and
each illuminator is disposed on said protruded side surface of said visual-side substrate.

19. A reflection type liquid-crystal display device according to claim 1, wherein each illuminator is disposed and held on said side surface of said visual-side substrate in such a manner that said illuminator is enclosed by a reflection type light source holder and end portions of said light source holder are bonded to end portions of upper and lower surfaces of said visual-side substrate.

20. A reflection type liquid-crystal display device, comprising:
a back-side substrate comprising an electrode and a reflector;
a liquid crystal layer on an upper surface of the back-side substrate;
a visual-side substrate, on an upper surface of the liquid crystal layer, comprising a transparent electrode, a low-refractive-index transparent layer on the transparent electrode, and a transparent substrate on the low-refractive-index transparent layer, wherein the low-refractive-index transparent layer is lower in refractive index than the transparent substrate;
an illuminator on a side surface of the transparent substrate of the visual-side substrate; and
an optical path control layer distinct from the transparent substrate of the visual-side substrate and disposed above an upper surface of the visual-side substrate, comprising a repetitive structure of optical path changing slopes on an upper surface thereof, wherein each of the optical path changing slopes is inclined at an angle from 35 to 48 degrees with respect to a reference plane of the visual-side substrate,
wherein an incident light from said illuminator is transmitted to said optical path control layer through said visual-side substrate,
wherein there is a difference in refractive index between the optical path control layer and the visual-side substrate not larger than 0.15, and
wherein the optical path control layer has a refractive index higher by 0.05 or more than that of the low-refractive-index transparent layer.

21. A reflection type liquid-crystal display device, comprising:
a visual-side substrate comprising a transparent layer, a low-refractive-index transparent layer lower in refractive index than the transparent layer, and a transparent electrode layer;
a back-side substrate comprising a back-side electrode;
a liquid crystal layer between said visual-side and back-side substrates;
a reflector adjacent to the back-side substrate;
at least one illuminator on a first side surface of said transparent layer; and
an optical path control layer distinct from said transparent layer and disposed above the transparent layer of the visual-side substrate having a repetitive structure of optical path changing slopes on an outer side of said visual-side substrate and being higher in refractive index than said low-refractive-index transparent layer, each of said optical path changing slopes being inclined at an inclination angle in a range of from 35 to 48 degrees with respect to a reference plane of said visual-side substrate,
wherein an incident light from said illuminator is transmitted to said optical path control layer through said visual-side substrate,
wherein there is a difference in refractive index between the optical path control layer and the visual-side substrate not larger than 0.15, and wherein the optical path control layer has a refractive index higher by 0.05 or more than that of the low-refractive-index transparent layer.

22. A reflection type liquid crystal display device according to claim 21, wherein said low-refractive-index transparent layer is disposed between said transparent substrate and said transparent electrode, and there is a difference in refractive index by 0.05 or more between said low-refractive-index transparent layer and said transparent substrate.

23. A reflection type liquid-crystal display device according to claim 21, wherein at least said transparent substrate is made of an optically isotropic material.

24. A reflection type liquid-crystal display device according to claim 21, further comprising a polarizer on one, of each opposite, side of a combination of said visual side substrate, said liquid crystal layer, and back-side substrate.

25. A reflection type liquid-crystal display device according to claim 24, further comprising at least one phase retarder layer disposed between said polarizer and said combination of said visual side substrate, said liquid crystal layer, and back-side substrate.

26. A reflection type liquid-crystal display device according to claim 21, wherein: the repetitive structure of optical path changing slopes are prism-shaped; and each of said optical path changing slopes in said optical path control layer faces said illuminator.

27. A reflection type liquid-crystal display device according to claim 26, wherein the prism-shaped optical path changing slopes are triangular in section.

28. A reflection type liquid-crystal display device according to claim 27, wherein each of said prism-shaped optical path changing slopes comprise a continuous groove which extends from one lateral end to the other lateral end of said optical path control layer in a ridgeline direction parallel with or inclined to said side surface of said transparent layer on which said illuminator is disposed.

29. A reflection type liquid-crystal display device according to claim 27, wherein said prism-shaped optical path changing slopes comprise discontinuous grooves each having a length not smaller than 5 times as large as a depth of said groove.

30. A reflection type liquid-crystal display device according to claim 29, wherein the length of each of said discontinuous grooves is approximately parallel to said side surface of said transparent layer on which said illuminator is disposed.

31. A reflection type liquid-crystal display device according to claim 27, wherein said prism-shaped optical path changing slopes comprise discontinuous grooves disposed at random.

32. A reflection type liquid-crystal display device according to claim 26, wherein each of said prism-shaped optical path changing slopes comprise a concave or convex portion shaped, in section, substantially like a triangle or quadrangle having at least two optical path changing slopes facing said illuminator.

33. A reflection type liquid-crystal display device according to claim 32, further comprising at least a second illuminator on at least a second side surface of said transparent layer.

34. A reflection type liquid-crystal display device according to claim 21, wherein said inclination angle of each of said optical path changing slopes in said optical path control layer is in a range of from 38 to 45 degrees.

35. A reflection type liquid-crystal display device according to claim 21, wherein said optical path control layer is made of a transparent sheet, and is bonded to the remaining portions of the liquid-crystal display device through an adhesive layer having a refractive index higher than that of said low-refractive-index transparent layer.

36. A reflection type liquid-crystal display device according to claim 35, wherein said adhesive layer comprises a tacky layer.

37. A reflection type liquid-crystal display device according to claim 35, wherein the refractive index of said optical path control layer and the refractive index of said adhesive layer is higher by 0.05 or more than that of said low-refractive-index transparent layer.

38. A reflection type liquid-crystal display device according to claim 21, wherein: at least the first side surface of the transparent layer is protruded outward from that of said back-side substrate.

39. A reflection type liquid-crystal display device according to claim 21, further comprising a reflection type light source holder enclosing said illuminator, wherein end portions of said light source holder are bonded to upper and lower surfaces of said transparent layer.

40. A reflection type liquid-crystal display device, comprising:
a back-side substrate comprising an electrode and a reflector;
a liquid crystal layer on an upper surface of the back-side substrate;
a visual-side substrate, on an upper surface of the liquid crystal layer, comprising a transparent electrode layer, a low-refractive-index transparent layer on the transparent electrode layer, and a transparent layer on the low-refractive-index transparent layer, wherein the low-refractive-index transparent layer is lower in refractive index than the transparent layer;
an illuminator on a side surface of the transparent layer; and
an optical path control layer distinct from the transparent layer and disposed above an upper surface of the transparent layer of the visual-side substrate, comprising a repetitive structure of optical path changing slopes on an upper surface thereof, wherein each of the optical path changing slopes is inclined at an angle from 35 to 48 degrees with respect to a reference plane of the visual-side substrate,
wherein an incident light from the illuminator is transmitted to the optical path control layer through the transparent layer,
wherein there is a difference in refractive index between the optical path control layer and the visual-side substrate not larger than 0.15, and
wherein the optical path control layer has a refractive index higher by 0.05 or more than that of the low-refractive-index transparent layer.

41. The reflection type liquid-crystal display device of claim 21, wherein the illuminator is positioned on the first side surface of the transparent layer to illuminate light directly into only the transparent layer.

42. The reflection type liquid-crystal display device of claim 21, wherein the illuminator is positioned on the first side surface of the transparent layer, entirely below the optical path control layer.

43. The reflection type liquid-crystal display device of claim 40, wherein the illuminator is positioned on the side surface of the transparent layer to illuminate light directly into only the transparent layer.

44. The reflection type liquid-crystal display device of claim 40, wherein the illuminator is positioned on the side surface of the transparent layer, entirely below the optical path control layer.

* * * * *